(12) United States Patent
Yang et al.

(10) Patent No.: US 10,009,796 B2
(45) Date of Patent: Jun. 26, 2018

(54) BANDWIDTH ADJUSTMENT METHOD AND BANDWIDTH ADJUSTMENT CONTROLLER

(71) Applicant: Huawei Technologies Co., Ltd., Shenzhen (CN)

(72) Inventors: Xun Yang, Shenzhen (CN); Tianyu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 14/939,885

(22) Filed: Nov. 12, 2015

(65) Prior Publication Data

US 2016/0066215 A1 Mar. 3, 2016

Related U.S. Application Data

(63) Continuation of application No. PCT/CN2013/088679, filed on Dec. 5, 2013.

(30) Foreign Application Priority Data

May 21, 2013 (CN) .......................... 2013 1 0189898

(51) Int. Cl.
*H04W 28/20* (2009.01)
*H04L 5/00* (2006.01)
*H04W 28/16* (2009.01)
*H04L 1/00* (2006.01)
*H04L 12/801* (2013.01)
*H04W 16/14* (2009.01)

(52) U.S. Cl.
CPC ........... *H04W 28/20* (2013.01); *H04L 1/0001* (2013.01); *H04L 5/0037* (2013.01); *H04L 47/10* (2013.01); *H04W 16/14* (2013.01); *H04W 28/16* (2013.01)

(58) Field of Classification Search
None
See application file for complete search history.

(56) References Cited

U.S. PATENT DOCUMENTS

| 2009/0191877 | A1 | 7/2009 | Jang et al. | |
| 2012/0166119 | A1* | 6/2012 | Nentwig | H04L 25/0384 702/66 |
| 2012/0294300 | A1* | 11/2012 | Tomita | H04W 72/0453 370/344 |

FOREIGN PATENT DOCUMENTS

| CN | 1925365 A | 3/2007 |
| CN | 101667960 A | 3/2010 |

(Continued)

*Primary Examiner* — Vladimir Magloire
*Assistant Examiner* — Donald H. B. Braswell
(74) *Attorney, Agent, or Firm* — Leydig, Voit & Mayer, Ltd.

(57) ABSTRACT

A bandwidth adjustment method includes: determining a bandwidth update value of a channel of a first network system and a bandwidth update value of a channel of a second network system and a bandwidth update value of a protective bandwidth according to a request of a user or a channel condition, so that updated bandwidths of the channels of the first network system and the second network system meet the request of the user or are adapted to requirements of channel conditions. By using the technical schemes, a network resource can be adjusted between multiple network systems when the multiple network systems share one network resource, thereby helping improve the application efficiency of a bandwidth resource and ensuring anti-interference capabilities of the network systems.

13 Claims, 4 Drawing Sheets

(56) References Cited

FOREIGN PATENT DOCUMENTS

| | | |
|---|---|---|
| CN | 102164307 A | 8/2011 |
| CN | 102195793 A | 9/2011 |
| CN | 102196451 A | 9/2011 |
| JP | 2007251935 A | 9/2007 |
| WO | WO 2009141686 A1 | 11/2009 |
| WO | WO 2011096062 A1 | 8/2011 |
| WO | WO 2012158076 A1 | 11/2012 |

* cited by examiner

BANDWIDTH ADJUSTMENT METHOD AND BANDWIDTH ADJUSTMENT CONTROLLER

CROSS-REFERENCE TO RELATED APPLICATIONS

This application is a continuation of International Application No. PCT/CN2013/088679, filed on Dec. 5, 2013, which claims priority to Chinese Patent Application No. 201310189898.7, filed on May 21, 2013, both of which are hereby incorporated by reference in their entireties.

TECHNICAL FIELD

The present application relates to the field of wireless communication technology, and in particular to a bandwidth adjustment method and a bandwidth adjustment controller.

BACKGROUND

A bandwidth is a difference between a highest frequency and a lowest frequency of an analog signal when the signal is transferred, i.e. an allowance value of a frequency bandwidth occupied to ensure a transmission rate and quality of certain transmitted information.

In a wireless communication, a frequency band for a signal transmission in a network system is defined as a channel of the network system, and a frequency range of the channel is referred to as the bandwidth of the channel for the signal.

With the development of wireless communication technology, the bandwidth resource is increasingly scarce. Multiple users in the network system share the same bandwidth resource to perform network communication, so as to take full advantage of the limited bandwidth in a wireless network communication. In order to address bandwidth communication conflict in the conventional technology, the following technical solutions are used in the conventional technology.

A first conventional technology provides a conflict avoidance solution based on a carrier detection. Specifically, a user in the network system detects whether a current channel is idle before a signal is transmitted. If the current channel is idle, data transmission is initiated, and the channel is occupied within a certain time duration to transmit the signal. If the current channel is busy, the channel is monitored again after a random time duration according to a predetermined rule. At present, the technical solution is mainly applied to an application of a free frequency spectrum in the network system.

In a second conventional technology, a channel is occupies for a long time. Specifically, once a channel is occupied, the channel may be used to transmit or receive a signal for a long time. At present, the solution is mainly applied to a cellular network and is not suitable to be widely applied to the free frequency spectrum.

In a process of researching the present application, the inventor found that the conventional technology at least has the following disadvantages.

The bandwidth application control in the conventional technology is only adapted to control multiple user channels in the same network system, but not adapted to a case that multiple network systems share one bandwidth.

SUMMARY

A bandwidth adjustment method is provided according to embodiments of the present application. The technical solution can be adapted to adjust a channel between multiple network systems in a case that the multiple network systems share the same bandwidth resource, thereby improving the application efficiency of the bandwidth resource and ensuring anti-interference capabilities of network systems.

A bandwidth adjustment controller is further provided according to embodiments of the present application. The technical solution can be adapted to adjust a channel between multiple network systems in a case that the multiple network systems share the same bandwidth resource, thereby improving the application efficiency of the bandwidth resource and ensuring anti-interference capabilities of the network systems.

Another bandwidth adjustment controller is further provided according to embodiments of the present application. The technical solution can be adapted to adjust a channel between multiple network systems in a case that the multiple network systems share the same bandwidth resource, thereby improving the application efficiency of the bandwidth resource and ensuring anti-interference capabilities of the network systems.

In a first aspect, a bandwidth adjustment method according to an embodiment of the present application may include:

adjusting a bandwidth of a channel of a first network system and a bandwidth of a channel of a second network system adjacent to a guard bandwidth based on a user request or a channel condition; and determining a bandwidth update value of the channel of the first network system, a bandwidth update value of the channel of the second network system and a bandwidth update value of the guard bandwidth, where an updated bandwidth of the channel of the first network system and an updated bandwidth of the channel of the second network system meet the user request or a requirement of the channel condition; and transmitting the bandwidth update value of the channel of the first network system to the first network system and transmitting the bandwidth update value of the channel of the second network system to the second network system, where the first network system adjusts the bandwidth of the channel of the first network system based on the bandwidth update value of the channel of the first network system, and the second network system adjusts the bandwidth of the channel of the second network system based on the bandwidth update value of the channel of the second network system.

In conjunction with the first aspect, in a first implementation, the bandwidth update value of the guard bandwidth meets the following relation:

$$GB_{n,1t'} = g(BW_{n,1}, BW_{n,2}),$$

where $GB_{n,1t'}$ is the bandwidth update value of the guard bandwidth, $BW_{n,1}$ is the bandwidth update value of the channel of the first network system, $BW_{n,2}$ is the bandwidth update value of the channel of the second network system, and $GB_{n,1t'} = g(BW_{n,1}, BW_{n,2})$ is a function increasing with an increase of any one of $BW_{n,1}$ and $BW_{n,2}$.

In conjunction with the first aspect, in the first implementation, the bandwidth update value of the channel of the first network system and the bandwidth update value of the channel of the second network system meet the following condition:

$$BW_{n,1} = n*BW_{e,1} = n'*BW_{e,1} + BW_{new,1t'} + BW_{new,1t'}, \text{ and}$$

$$BW_{n,2} = k*BW_{e,2} = k'*BW_{e,2} + (k-k')*BW_{e,2};$$

where $BW_{e,1}$ is a basic bandwidth unit of the channel of the first network system, $n'*BW_{e,1}$ is an initial bandwidth of the channel of the first network system, n and n' each are natural numbers, $BW_{new,1l}$ is a bandwidth adjustment sub-amount for a first side of the channel of the first network system, where the first side is a side of the first network system close to the second network, $BW_{new,1r}$ is a bandwidth adjustment sub-amount for a second side of the channel of the first network system, where the second side is a side of the first network system opposite to the first side, $BW_{e,2}$ is a basic bandwidth unit of the channel of the second network system, $k'*BW_{e,2}$ is an initial bandwidth of the channel of the second network system, k and k' each are natural numbers, and $(k-k')*BW_{e,2}$ is a bandwidth adjustment amount for the channel of the second network system.

In conjunction with the first aspect, in the first implementation, $BW_{new,1r}$ is set to be zero.

In conjunction with the first aspect, in the first implementation, $GB_{n,11}=g(BW_{n,1}, BW_{n,2})$ is further a function decreasing with decreases of $BW_{n,1}$ and $BW_{n,2}$.

In conjunction with the first aspect, in the first implementation, the adjusting a bandwidth of a channel of a first network system and a bandwidth of a channel of a second network system adjacent to a guard bandwidth based on a user request or a channel condition includes:

adjusting the bandwidth of the channel of the first network system and the bandwidth of the channel of the second network system adjacent to the guard bandwidth, based on a user bandwidth change request of the first network system, or a user bandwidth change request of the second network system, or user bandwidth change requests of the first network system and the second network system; or adjusting the bandwidth of the channel of the first network system and the bandwidth of the channel of the second network system adjacent to the guard bandwidth, based on a busy degree of the channel of the first network system, or a busy degree of the channel of the second network system, or busy degrees of the channels of the first network system and the second network system; or adjusting the bandwidth of the channel of the first network system and the bandwidth of the channel of the second network system adjacent to the guard bandwidth, based on the followings:

a user bandwidth change request of the first network system, or a user bandwidth change request of the second network system, or user bandwidth change requests of the first network system and the second network system, and a busy degree of the channel of the first network system, or a busy degree of the channel of the second network system, or busy degrees of the channels of the first network system and the second network system.

In conjunction with the first aspect, in the first implementation, the busy degree of the channel of the first network system and/or the busy degree of the channel of the second network system are detected and reported by a user of the first network system and/or a user of the second network system, or detected by a controller, where the controller is configured to control bandwidth adjustment of the first network system and bandwidth adjustment of the second network system.

In conjunction with the first aspect, in the first implementation, in a case that the busy degree of the channel of the first network system is equal to or greater than a predetermined busy upper limit, the adjusting a bandwidth of a channel of a first network system and a bandwidth of a channel of a second network system adjacent to a guard bandwidth based on a user request or a channel condition includes:

setting an idle frequency band in a common frequency range as a channel of the first network system to replace the channel of the first network system to be adjusted;

setting $n'*BW_{e,1}$ to be zero; and adjusting the bandwidth of the channel of the first network system and the bandwidth of the channel of the second network system adjacent to the guard bandwidth based on the user request or the channel condition.

In conjunction with the first aspect, in the first implementation, the bandwidth adjustment method further includes:

determining an interference source of the channel of the first network system to be adjusted; and setting the channel of the first network system to be adjusted as a channel of the second network system in a case that the interference source comes from the second network system; or setting the channel of the first network system to be adjusted as the guard bandwidth in a case that the interference source does not come from the second network system.

In conjunction with the first aspect, in the first implementation, the channel of the first network system is a continuous extending channel, or multiple channel frequency ranges with a guard interval between any two adjacent channel frequency ranges.

In a second aspect, a bandwidth adjustment controller according to an embodiment of the present application may include:

a bandwidth adjustment unit configured to: adjust a bandwidth of a channel of a first network system and a bandwidth of a channel of a second network system adjacent to a guard bandwidth based on a user request or a channel condition; determine a bandwidth update value of the channel of the first network system, a bandwidth update value of the channel of the second network system and a bandwidth update value of the guard bandwidth; transmit the bandwidth update value of the channel of the first network system to the first network system through a network interface; and transmit the bandwidth update value of the channel of the second network system to the second network system through the network interface, where the first network system adjusts the bandwidth of the channel of the first network system based on the bandwidth update value of the channel of the first network system, and the second network system adjusts the bandwidth of the channel of the second network system based on the bandwidth update value of the channel of the second network system, and the updated bandwidth of the channel of the first network system and the updated bandwidth of the channel of the second network system meet the user request or a requirement of the channel condition; and the network interface is network-connected to the bandwidth adjustment unit, the first and the second network systems which are external.

In conjunction with the second aspect, in an first implementation, the bandwidth adjustment unit is configured to adjust a bandwidth of a channel of a first network system and a bandwidth of a channel of a second network system adjacent to a guard bandwidth, and further to:
determine the bandwidth update value of the guard bandwidth as the following relation:

$$GB_{n,1l} = g(BW_{n,1}, BW_{n,2}),$$

where $GB_{n,1l}$ is the bandwidth update value of the guard bandwidth, $BW_{n,1}$ the bandwidth update value of the channel of the first network system, $BW_{n,2}$ is the bandwidth update value of the channel of the second network system, and $GB_{n,1l} = g(BW_{n,1}, BW_{n,2})$ is a function increasing with an increase of any one of $BW_{n,1}$ and $BW_{n,2}$.

In conjunction with the second aspect, in the first implementation, the bandwidth adjustment unit is configured to adjust the bandwidth of the channel of the first network system and the bandwidth of the channel of the second network system adjacent to the guard bandwidth, and further to:
determine the bandwidth update value of the channel of the first network system and the bandwidth update value of the channel of the second network system as the following condition:

$$BW_{n,1} = n*BW_{e,1} = n'*BW_{e,1} + BW_{new,1l} + BW_{new,1r}, \text{ and}$$

$$BW_{n,2} = k*BW_{e,2} = k'*BW_{e,2} + (k-k')*BW_{e,2};$$

where $BW_{e,1}$ is a basic bandwidth unit of the channel of the first network system,
$n'*BW_{e,1}$ is an initial bandwidth of the channel of the first network system,
n and n' each are natural numbers,
$BW_{new,1l}$ is a bandwidth adjustment sub-amount for a first side of the channel of the first network system, where the first side is a side of the first network system close to the second network,
$BW_{new,1r}$ is a bandwidth adjustment sub-amount for a second side of the channel of the first network system, where the second side is a side of the first network system opposite to the first side,
$BW_{e,2}$ is a basic bandwidth unit of the channel of the second network system,
$k'*BW_{e,2}$ is an initial bandwidth of the channel of the second network system,
k and k' each are natural numbers, and
$(k-k')*BW_{e,2}$ is a bandwidth adjustment amount for the channel of the second network system.

In conjunction with the second aspect, in the first implementation, the bandwidth adjustment unit is configured to adjust a bandwidth of a channel of a first network system and a bandwidth of a channel of a second network system adjacent to a guard bandwidth, and further to:
determine $GB_{n,1l} = g(BW_{n,1}, BW_{n,2})$ as a function decreasing with decreases of $BW_{n,1}$ and $BW_{n,2}$.

In conjunction with the second aspect, in a first implementation, a channel condition detection unit is configured to detect the channel of the first network system and/or the channel of the second network system, to determine a busy degree of the channel of the first network system and/or a busy degree of the channel of the second network system;
where the bandwidth adjustment unit is configured to:
adjust the bandwidth of the channel of the first network system and the bandwidth of the channel of the second network system adjacent to the guard bandwidth, based on a user bandwidth change request of the first network system, or a user bandwidth change request of the second network system, or user bandwidth change requests of the first network system and the second network system; or
adjust the bandwidth of the channel of the first network system and the bandwidth of the channel of the second network system adjacent to the guard bandwidth, based on the busy degree of the channel of the first network system, or the busy degree of the channel of the second network system, or the busy degrees of the channels of the first network system and the second network system; or
adjust the bandwidth of the channel of the first network system and the bandwidth of the channel of the second network system adjacent to the guard bandwidth based on the followings:
a user bandwidth change request of the first network system, or a user bandwidth change request of the second network system, or user bandwidth change requests of the first network system and the second network system, and
the busy degree of the channel of the first network system, or the busy degree of the channel of the second network system, or the busy degrees of the channels of the first network system and the second network system.

Therefore, in the technical solution according to the embodiments, in the case of a adjustment of channels of multiple network systems which share the bandwidth of the common frequency band, a guard bandwidth between adjusted channels of any two network systems may be changed dynamically with a change in the bandwidth of the channel of the network system to be adjusted, thereby reducing communication interference between the network systems which share the same frequency band resource, and ensuring the communication quality.

DETAILED DESCRIPTION OF EMBODIMENTS

First Embodiment

A bandwidth adjustment method according to the embodiment is applicable to adjust bandwidths of channels of multiple network systems within the same common frequency range in a case that the multiple network systems share the bandwidth of the same common frequency range.

In the embodiment, in order to avoid interference between the multiple network systems, a bandwidth for reducing interference between any two network systems is separated between the network systems, which is referred to as a guard bandwidth. In this case, the channels of the multiple network systems and the guard bandwidth between any two network systems each are within the bandwidth of the same common frequency range.

In the embodiment, a channel of any network system may be a continuous extending channel, or may include multiple channel frequency ranges with a guard interval between any two adjacent channel frequency ranges. Also, one or more of the network systems may have continuous extending channels, and other one or more network systems may have channels including multiple channel frequency ranges with a guard interval between any two adjacent channel frequency ranges.

Figure 1:
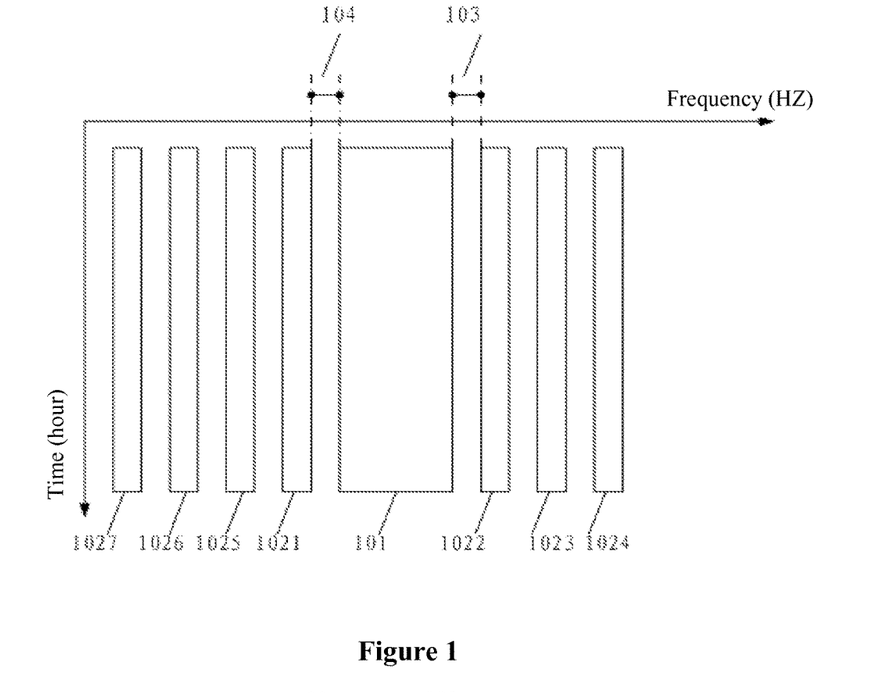
FIG. 1 is a schematic distribution and division diagram of frequency bands which are in multiple network systems and share a bandwidth of a common frequency range according to an embodiment of the present application.

For example, FIG. 1 is a schematic diagram of the embodiment. In FIG. 1, a first network system and a second network system share a bandwidth of the same common frequency range. A channel of the first network system is a continuous extending channel 101 in FIG. 1. A channel of the second network system includes multiple discrete frequency ranges 1021, 1022, 1023, 1024, 1025, 1026 and 1027 in FIG. 1. Guard bandwidths 103 and 104 are arranged between the channel 101 of the first network system and the second network system.

For ease of description, in the embodiment, a channel of a network system to be adjusted currently (which may be a continuous extending channel or a channel frequency range) is defined as a channel of a first network system, and a channel of another network system (which may be a continuous extending channel or a channel frequency range) is adjacent to an adjusted side of the channel of the first network system to be adjusted. For example, when the channel 101 of the first network system in FIG. 1 needs to be adjusted, in a current adjustment, the left side of the channel 101 of the first network system is adjusted, the frequency range 1021 of the channel of the second network is adjacent to the left side of the channel 101 of the first network system. In this case, the channel 101 of the first network system and the frequency range 1021 of the channel of the second network both need to be adjusted. If the adjustment is performed on a right side of the channel 101 of the first network system, the channel 101 of the first network system and the frequency range 1022 of the channel of the second network need to be adjusted. If the adjustment is performed on both the left side and right side of the channel 101 of the first network system, the channel 101 of the first network system and the frequency ranges 1021 and 1022 of the channel of the second network need to be adjusted. When both the left side and right side of the channel 101 of the first network system needs to be adjusted, the left or right side of the channel 101 may be firstly adjusted, and finally two-side adjustment is performed.

It should be noted that, for ease of description for the channel adjustment according to the embodiment, in each adjustment, a channel of a network to be adjusted or a channel frequency range of the channel is referred as a channel of the first network system, and a channel of any another network system adjacent to an adjusted side of the channel of the first network system to be adjusted currently (a guard bandwidth is arranged therebetween) or a frequency range of the channel is referred as a channel of the second network system.

For example, in the system shown in FIG. 1, when the channel 101 of a network system 1 needs to be adjusted currently, the channel 101 of the network system 1 is served as a channel of the first network system to be adjusted, and the left side and right side of the channel 101 needs to be adjusted. The channel frequency range 1021 of the network system 2 at the left side of the channel 101 may be served as a channel of the second network system when the left side of the channel 101 is adjusted; and the channel frequency range 1022 of the network system 2 at the right side of the channel 101 may be served as a channel of the second network system when the right side of the channel 101 is adjusted.

Figure 2:
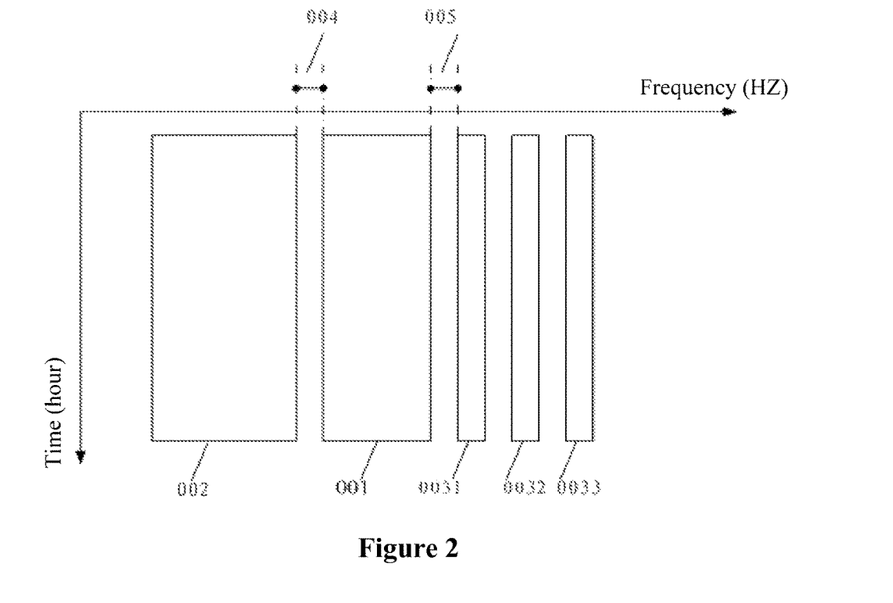
FIG. 2 is another schematic distribution and division diagram of frequency bands which are in multiple network systems and share a bandwidth of a common frequency range according to an embodiment of the present application.

For another example, in a system as shown in FIG. 2, a channel of a network system 1 is a continuous extending channel 001, a channel of a network system 2 is a continuous extending channel 002, a channel of a network system 3 includes channel frequency ranges 0031, 0032 and 0033, and guard intervals are arranged between the channel frequency ranges 0031, 0032 and 0033. Guard bandwidths 004 and 005 are shown in the FIG. 2. When the channel 001 of the network system 1 needs to be adjusted currently, the channel 001 of the network system 1 is served as a channel of the first network system to be adjusted, and the left side and the right side of the channel 001 need to be adjusted. A continuous extending channel 002 of the network system 2 at the left side of the channel 001 is served as a channel of the second network system when the left side of the channel 001 is adjusted; and a channel frequency range 0031 in a channel of a network system 3 at the right side of the channel 001 is served as a channel of the second network system in a case that the right side of the channel 001 is adjusted.

Figure 3:
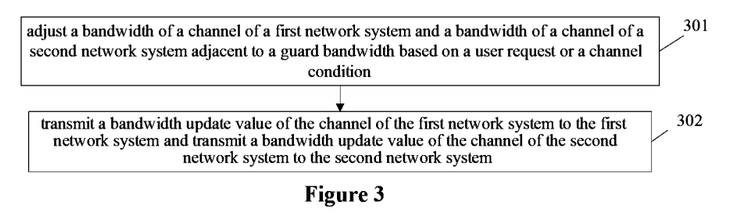
FIG. 3 is a flowchart of a bandwidth adjustment method according to a first embodiment of the present application.

With Reference to FIG. 3, the adjustment method mainly includes the following steps.

In step 301, a bandwidth of a channel of a first network system and a bandwidth of a channel of a second network system adjacent to a guard bandwidth are adjusted based on a user request or a channel condition.

In the step, the bandwidth of the channel of the first network system and the bandwidth of the channel of the second network system adjacent to a guard bandwidth are adjusted based on the user request or the channel condition, to determine a bandwidth update value of the channel of the first network system, a bandwidth update value of the channel of the second network system and a bandwidth update value of the guard bandwidth.

In a schematic example of the embodiment, the updated bandwidth of the channel of the first network system and the updated bandwidth of the channel of the second network system meet the user request or a requirement of a current channel condition. For example, in the case that a user of the first network system requests to extend the bandwidth, or that the channel of the first network system is in a busy state and needs to be extended, the bandwidth of the channel of the first network system is extended to meet the user request or the requirement for the current channel condition. When the bandwidth of the channel of the first network system is adjusted, the bandwidth of the channel of the second network system which is adjacent to the channel of the first network system and separated by a guard bandwidth also needs to be adjusted (narrowing or extending the channel of the second network system) no matter whether the bandwidth of the channel of the first network system is extended or narrowed.

In a schematic example of the embodiment, a threshold for determine a busy channel may be a threshold value for the number of activated users or a threshold value for the number of users per unit bandwidth. The number of activated users is defined as Na and a bandwidth is defined as BW, a busy degree may be determined by directly comparing the number of activated users with the threshold thereof, or comparing the number of users per unit bandwidth Na/BW with the threshold thereof.

In another schematic example of the embodiment, the following adjustment scheme can be applied to the embodiment. In the adjustment scheme, a guard bandwidth between the channels of two adjusted network systems is further adjusted. $GB_{n,11}=g(BW_{n,1}, BW_{n,2})$ is defined as a limitation for adjusting the channel of the first network system and the channel of the second network systems, such that the update value of the guard bandwidth meets the relation: $GB_{n,1l}=g(BW_{n,1}, BW_{n,2})$, where $GB_{n,1l}=g(BW_{n,1}, BW_{n,2})$ is a function increasing with an increase of any one of $BW_{n,1}$ and $BW_{n,2}$, $GB_{n,1l}$ is the bandwidth update value of the guard bandwidth, $BW_{n,1}$ the bandwidth update value of the channel of the first network system, and $BW_{n,2}$ is the bandwidth update value of the channel of the second network system. That is, if the bandwidth of any one of the channel of the first network system and the channel of the second network system is extended, the guard bandwidth between the channels of the two adjusted systems is also extended. With the adjustment scheme, the guard bandwidth is increased in the case that the bandwidth of the channel of network system at any one of the two sides of the guard bandwidth is increased. Therefore, this can avoid a case that an interference of a channel of any network system of the two network systems to a channel of the other network system is increased due to an increased power consumption power leakage of the channel of any network system (the higher the transmitted power is, the more the power consumption power leakage). Therefore, communication interference between the network systems sharing the same frequency band resource may be reduced and the communication quality may be ensured.

In step 302, the bandwidth update value of the channel of the first network system is transmitted to the first network system, and the bandwidth update value of the channel of the second network system is transmitted to the second network system.

After the bandwidth update value of the channel of the first network system and the bandwidth update value of the channel of the second network system are obtained in step 301, the bandwidth update value of the channel of the first network system is transmitted to the first network system, and the bandwidth update value of the second network system is transmitted to the second network system. Then, the first network system adjusts the channel of the first network system from an initial bandwidth value of the adjusted channel to the bandwidth update value based on the bandwidth update value of the channel of the first network system, and thus the first network system can perform network communication through the adjusted channel. The second network system adjusts the channel of the second network system from an initial bandwidth value of the adjusted channel to the bandwidth update value based on the bandwidth update value of the channel of the second network system, and thus the second network system can perform network communication through the adjusted channel.

In the step, the process for the network system adjusting the bandwidth of the channel based on the bandwidth update value of the adjusted channel, may include but not limited to the conventional technology.

Therefore, in the embodiment, in the adjustment of channels of multiple network systems sharing a bandwidth of a common frequency band, the guard bandwidth between the channels of any two of the adjusted network systems may be changed dynamically as a change in a bandwidth of a currently adjusted channel of a network system, thereby reducing communication interference between the network systems sharing the same frequency band resource and ensuring a communication quality. It should be noted that, in the embodiment, an adjustment for a channel of any network system may only relate to channels of different users in the same network system, for example, when the frequency band 1025 of the second network system in FIG. 1 is adjusted, the frequency band 1021 and/or frequency band 1026 of the second network system are/is adjusted correspondingly. In a case that the adjustment only relates to the channel of the second network system, the process for adjusting the channel of the second network system may include but not limited to the conventional technology. Similarly, adjustment for a channel of a user of the first network system is similar to the above case in a case that the channel of the first network system also includes discrete frequency ranges.

In addition, in a schematic implementation of the embodiment, an implementation of the technical solution of the embodiment may include but not limited to the controller connected to all the network systems.

Second Embodiment

The embodiment is a further optional embodiment of the first embodiment, which differ from the first embodiment in that:

In the embodiment, in step 301 in FIG. 3, the bandwidth of the channel of the first network system and the bandwidth of the channel of the second network system adjacent to the guard bandwidth are adjusted, to determine the bandwidth update value of the channel of the first network system, the bandwidth update value of the channel of the second network system and the bandwidth update value of the guard bandwidth. In this case, the bandwidth update value of the channel of the first and the bandwidth update value of the channel of the second network system meet the condition $GB_{n,1l}=g(BW_{n,1}, BW_{n,2})$ in a schematic adjustment mode according to the first embodiment, and further the adjustment further meets the following function (1):

$$\begin{cases} BW_{n,1} = n*BW_{e,1} = n'*BW_{e,1} + BW_{new,11} + BW_{new,1r} \\ BW_{n,2} = k*BW_{e,2} = k'*BW_{e,2} + (k-k')*BW_{e,2} \\ GB_{n,11} = g((k*BW_{e,2}), (n*BW_{e,1})) \end{cases} \quad (1)$$

The bandwidth of the channel of the first network system and the channel of the second network system separated from the channel of the first network system via a guard bandwidth are calculated and adjusted based on the function (1). If the second network system includes a continuous extending channel, the channel of the second network system to be adjusted is the entire continuous extending channel of the second network system. If the channel of the second network system includes multiple discrete frequency ranges, the channel of the second network system to be adjusted is a frequency range of the channel adjacent to the guard channel of the second network system.

In function (1), $n*BW_{e,1}$ is a bandwidth update value of the channel of the first network system to be adjusted, $n'*BW_{e,1}$ is an initial bandwidth of the channel of the first network system, $BW_{e,1}$ is a basic bandwidth unit of the channel of the first network system, and a bandwidth of the system is adjusted with an integer multiple of $BW_{e,1}$, n and n' are natural numbers, $BW_{new,1l}$ is a bandwidth adjustment sub-amount for one side of the channel of the first network system. As shown in FIG. 1, when bandwidth adjustment is performed on the left side of the first network system, $BW_{new,1l}$ is a bandwidth adjustment sub-amount for the left side of the channel of the first network system, $BW_{new,1r}$ is a bandwidth adjustment sub-amount for a side, far away from the channel of the second network system, of the channel of the first network system. As shown in FIG. 1, when bandwidth adjustment is performed on the right side of the first network system, $BW_{new,1r}$ is a bandwidth adjustment sub-amount for the right side of the channel of the first network system, $k*BW_{e,2}$ is a bandwidth update value of the channel of the second network system, $k'*BW_{e,2}$ is an initial bandwidth of the channel of the second network system, $BW_{e,2}$ is a basic bandwidth unit of the channel of the second network system, k and k' are natural numbers, and $(k-k')*BW_{e,2}$ is a bandwidth adjustment amount for the channel of the second network system, and the bandwidth adjustment amount includes bandwidth adjustment amounts for the left side and right side of the channel of the second network system.

In the above function (1), a first bandwidth adjustment sub-amount to be adjusted is: $BW_{new,1l}+BW_{new,1r}=(n-n')*BW_{e,1}$, which is an integer multiple of the bandwidth basic unit of the channel of the first network system. In the case of n>n', the bandwidth adjustment sub-amount is a positive number and the bandwidth of the channel of the first network system is extended. In the case of n<n', the bandwidth adjustment sub-amount is a negative number and the bandwidth of the channel of the first network system is narrowed. In the case of n=n', the bandwidth adjustment sub-amount is zero and the bandwidth of the channel of the first network system remains unchanged. In this case, a process including but not limited to a frequency band hopping is performed.

The controller calculates the bandwidth update values to be obtained and a bandwidth update value of the guard bandwidth between the channel of the first network system to be adjusted and the channel of the second network system to be adjusted according to the above function, transmits the updated bandwidth update value of the channel of the first network system to be adjusted to the first network system, and transmits the updated bandwidth update value of the channel of the second network system to be adjusted to the second network system. Thus, the first network system adjusts the channel of the first network system according to the adjusted bandwidth update value, and second network system adjusts the channel of the second network system according to the adjusted bandwidth update values.

Similar to the first embodiment, in a schematic implementation of the embodiment, an implementation of the technical solution of the embodiment may include but not limited to the controller connected to all the network systems.

Thus, in addition to the advantages of the embodiment, the technical solution of the embodiment may have the following advantage. Because the bandwidth of the channel of any network system is adjusted in units of an integer multiple of a predetermined bandwidth basic unit of the system in a process for adjusting the channels of multiple network systems, the channels of the multiple network systems are adjusted more easily and the implementation is more simple.

In another schematic example of the embodiment, when the channel of the first network system to be adjusted and the channel of the second network system to be adjusted are adjusted in the embodiment, the bandwidth update function $GB_{n,1l}=g((k*BW_{e,2}), (n*BW_{e,1}))$ of the guard bandwidth between the channel of the first network system to be adjusted and the channel of the second network system to be adjusted decreases with a decrease of the bandwidth update value $(n*BW_{e,1})$ of the channel of the first network system to be adjusted and the bandwidth update value $(k*BW_{e,2})$ of the channel of the second network system to be adjusted. That is, the guard bandwidth $GB_{n,1l}$ is decreased in the case that $(k*BW_{e,2})$ and $(n*BW_{e,1})$ are both decreased, thereby adapting to channel situations of network systems at two sides of the guard bandwidth. In the case that the channels of the network systems at the two sides of the guard bandwidth are both narrowed (a communication busy degree is reduced after the adjustment), the guard bandwidth is reduced. In this way, it is ensured that the current guard bandwidth is adapted to the current network channel condition, and the bandwidth resource can be used effectively and fully.

In another schematic example of the embodiment, when a channel of any one network systems to be adjusted is adjusted in the embodiment, it may be preset that the bandwidth adjustment sub-amount for the right side of the channel of the network system is zero. For example, in the adjustment for the channel of the first network system, the bandwidth adjustment sub-amount $BW_{new,1r}$ for the right side of the channel of the first network system may be set to be zero. That is, a case that the adjustment for the bandwidth of the network system to be adjusted is performed on the left side of the channel (extending or narrowing) is the default. Similarly, in the adjustment for the bandwidth of the channel of the adaptively adjusted second network system, it may be preset that the bandwidth adjustment sub-amount for the right side of the channel of the network system is zero. That is, a case that the adjustment for the bandwidth of the network system to be adjusted is performed on the left side of the channel (extending or shrinking) is the default. A specific process is shown in FIGS. 4 and 5.

Figure 4:
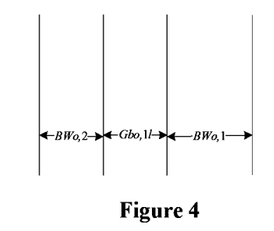
FIG. 4 is a schematic distribution diagram of frequency bands in multiple network systems before the bandwidths of the network systems are adjusted according to a second embodiment of the present application.

Referring to FIG. 4, before bandwidth adjustment, the bandwidth of the channel of the first network system to be adjusted is $BW_{0,1}$, the bandwidth of the guard bandwidth is $GB_{0,1l}$, and the bandwidth of the channel of the second network system adjacent to the guard bandwidth is $BW_{0,2}$.

It is assumed that the right side of the channel of the first network system is unchanged, an extension is performed on the left side of the channel, and a bandwidth extension sub-amount is $BW_{new,1l}$, when the channel of the first network system needs to be extended. In this case, the channel of the first network system is extended, such that at least a portion of frequency range of the guard bandwidth is used as the channel of the first network system.

Figure 5:
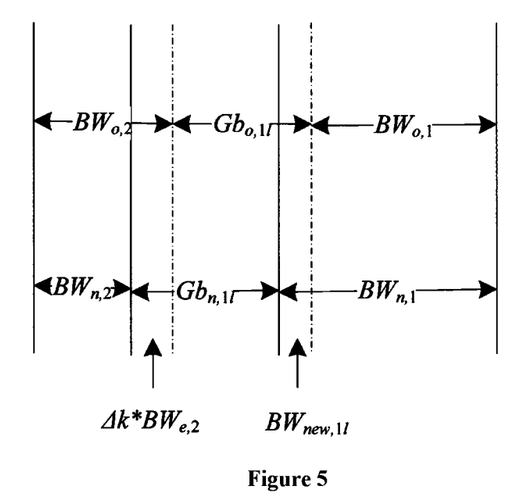
FIG. 5 is a schematic distribution diagram of frequency bands in multiple network systems after the bandwidths of the network systems are adjusted according to the second embodiment of the present application.

If $BW_{new,1l} < GB_{0,1l}$, a portion of frequency ranges of the original guard bandwidth are occupied by the channel of the first network system, as shown in FIG. 5. Because the bandwidth of the channel of the first network system is extended, the guard bandwidth should also be extended according to the function (1) in the embodiment. Thus, the bandwidth adjustment amount for extending the guard bandwidth at the left side is greater than $BW_{new,n1l}$. The guard bandwidth is extended at the left side thereof, to occupy the frequency range originally occupied by the channel of the second network system. The bandwidth of the channel of the second network system and the bandwidth of the guard bandwidth are adjusted, while it is ensured that the adjustment amount for the channel of the second network system is an integer multiple of the bandwidth basic unit of the second network system.

Figure 6:
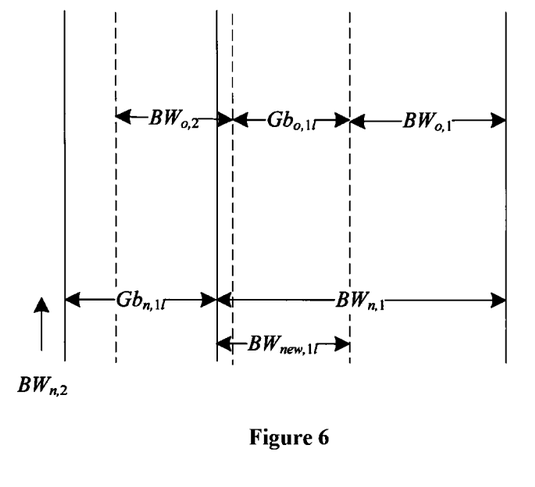
FIG. 6 is another schematic distribution diagram of frequency bands in multiple network systems before the bandwidths of the network systems are adjusted according to the second embodiment of the present application.

If $BW_{new,1l} > GB_{0,1l}$, the original guard bandwidth and at least a portion of frequency range of the channel of the second network system are occupied by the channel of the first network system, as shown in FIG. 6. Because the bandwidth of the channel of the first network system is extended, the guard bandwidth should also be extended according to the function (1) in the embodiment. The bandwidth adjustment amount for extending the guard bandwidth at the left side is greater than $BW_{new,1l}$. The guard bandwidth is extended at the left side thereof, to occupy the frequency range originally occupied by the channel of the second network system. The bandwidth of the channel of the second network system and the bandwidth of the guard bandwidth are adjusted, while it is ensured that the adjustment amount for the channel of the second network system is an integer multiple of the bandwidth basic unit of the second network system.

In the above, taking a side of a channel is adjusted while the other side of the channel remains unchanged in the adjustment for the channel of the network system is served as the schematic example of the embodiment, which is not limited thereto in implementation. Both two sides of the channel of the network system can be adjusted in the adjustment process. When the adjustment for any side results in adjustment for a channel of other network system, the adjustment is performed by the technical solution similar to the adjustment for the left side described above.

In a schematic example of the embodiment, in the bandwidth adjustment control for the channel of the network systems, the bandwidths of the channels of the multiple network systems may be adjusted based on but not limited to a user bandwidth change request of the first network system and/or a user bandwidth change request of the second network system (the bandwidth change request may include but not limited to idle channel detection information for the common frequency band adopted by a current system, in addition to a bandwidth change request, where the idle channel detection information is reported by the network system) and/or based on a busy degree of the first network system and/or a busy degree of the second network system detected initiatively by a controller, where the controller is configured to perform channel overall control adjustment on the network system.

In a schematic example of the embodiment, the bandwidth adjustment for the network system may also be performed based on but not limited to the following technical solution.

In the case that the busy degree of the channel of the first network system to be adjusted is equal to or greater than a predetermined busy upper limit, an idle frequency band is reset from a frequency range of the network system as a channel of the first network system, an initial value of the bandwidth of the first network system is set to be zero. In the bandwidth adjustment of the channel of the first network system, the bandwidth of the channel within the first network system is adjusted based on the conventional technology if a frequency range adjacent to the channel of the first system to be adjusted is other frequency range of the channel of the first network system. The bandwidth of the channel of the first network system is adjusted according to the function (1) if a frequency range adjacent to the channel of the first network system to be adjusted is occupied by a channel of another network system (referred to as a second network system). In this case, the bandwidth of the channel of the first network system in the original idle frequency band is $BW_{n,1} = BW_{new,1l} + BW_{new,1r} = n*BW_{e,1}$, and thus the bandwidth update value of the channel of the first network system is obtained. Correspondingly, the guard bandwidth and the bandwidth of the channel of the second network system are adjusted adaptively based on the adjustment for the channel of the first network system.

In another schematic example of the embodiment, the bandwidth of the channel of the first network system is adjusted based on idle channel information reported by a user or detected initiatively by the controller. A current idle channel is set as a frequency range of the channel of the first network system. In this case, an interference source of the channel within an original frequency range of the channel of the first network system is determined. If the interference source of the channel is the second network system adjacent to the first network system, the original frequency range of the channel of the first network system is served as the frequency range of the channel of the second network system. If the interference source of the channel is not the second network system, the frequency range of the channel of the first network system is set as a guard bandwidth. With the technical solution, the technical solution of the embodiment is adapted to network systems for performing various limiting communications, thereby taking full advantage of the idle channel, and further improving utilization of bandwidth, and reducing network communication interference.

Third Embodiment

Figure 7:
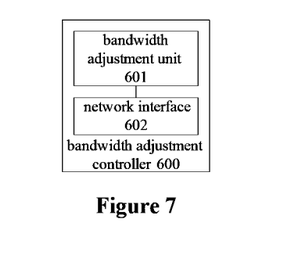
FIG. 7 is a schematic structural diagram of a bandwidth adjustment controller according to a third embodiment of the present application.

As shown in FIG. 7, a bandwidth adjustment controller 600 is provided according to an embodiment, which is provided in a network. The controller 600 is configured to control an adjustment for a channel of the first network system and a channel of the second network system, which may be an independent subject or integrated with any network system device in the conventional technology.

The bandwidth adjustment controller 600 according to the embodiment mainly includes: a bandwidth adjustment unit 601 and a network interface 602. A connection relation of respective parts of the controller 600 and an operation principle of the controller 600 are as follows.

The bandwidth adjustment unit 601 is configured to adjust a bandwidth of a channel of a first network system and a bandwidth of a channel of a second network system adjacent to a guard bandwidth; determine a bandwidth update value of the channel of the first network system, a bandwidth update value of the channel of the second network system and a bandwidth update value of the guard bandwidth based on a user request or a channel condition; transmit the bandwidth update value of the channel of the first network system to the first network system through the network interface 602; and transmit the bandwidth update value of the channel of the second network system to the second network system via the network interface 602, such that the first network system adjusts the bandwidth of the channel of the first network system based on the bandwidth update value of the channel of the first network system, and the second network system adjusts the bandwidth of the channel of the second network system based on the bandwidth update value of the channel of the second network system.

Specifically, the guard bandwidth, the channel of the first network system and the channel of the second network system are all in the same common frequency range. The first network system and the second network system are separated by the guard bandwidth to reduce interference between the network systems.

In a schematic example of the embodiment, when adjusting the bandwidth of the channel of the first network system and the bandwidth of the channel of the second network system, the bandwidth adjustment unit 601 is configured to enable the updated bandwidth of the channel of the first network system and the updated bandwidth of the channel of the second network system to meet the user request or a requirement of the channel condition, and determine the update value of the guard bandwidth to meet the following relation: $GB_{n,1l}=g(BW_{n,1}, BW_{n,2})$, where $GB_{n,1l}$ is the bandwidth update value of the guard bandwidth, $BW_{n,1}$ is the bandwidth update value of the channel of the first network system, $BW_{n,2}$ is the bandwidth update value of the channel of the second network system, and $GB_{n,1l}=g(BW_{n,1}, BW_{n,2})$ is a function increasing with an increase of any one of $BW_{n,1}$ and $BW_{n,2}$. With the schematic adjustment scheme, the guard bandwidth is increased in the case that the bandwidth of the channel of network system at any one of two sides of the guard bandwidth is increased. Therefore, this can avoid a case that an interference of a channel of any network system of the two network systems to a channel of the other network system is increased due to an increased power consumption power leakage of the channel of the any network system (the higher the transmitted power is, the more the power consumption power leakage). Therefore, communication interferences between the network systems sharing the same frequency band resource may be reduced and the communication quality may be ensured.

In a further schematic example of the embodiment, when adjusting the bandwidth of the channel of the first network system and the bandwidth of the channel of the second network system, in addition to the condition $GB_{n,1l}=g(BW_{n,1}, BW_{n,2})$, the bandwidth adjustment unit 601 may further meet the following condition:

$$BW_{n,1}=n*BW_{e,1}=n'*BW_{e,1}+BW_{new,1l}+BW_{new,1r},$$

$$BW_{n,2}=k*BW_{e,2}=k'*BW_{e,2}(k-k')*BW_{e,2};$$

where $BW_{e,1}$ is a basic bandwidth unit of the channel of the first network system, n'*$BW_{e,1}$ is an initial bandwidth of the channel of the first network system, n and n' each are natural numbers, $BW_{new,1l}$ is a bandwidth adjustment sub-amount for a first side of the channel of the first network system, where the first side is a side of the first network system close to the second network, $BW_{new,1r}$ is a bandwidth adjustment sub-amount for a second side of the channel of the first network system, where the second side is a side of the first network system opposite to the first side, $BW_{e,2}$ is a basic bandwidth unit of the channel of the second network system, k'*$BW_{e,2}$ is an initial bandwidth of the channel of the second network system, k and k' each are natural numbers, and $(k-k')*BW_{e,2}$ is a bandwidth adjustment amount for the channel of the second network system.

In another example of the embodiment, when adjusting the bandwidth of the channel of the first network system and the bandwidth of the channel of the second network system, the bandwidth adjustment unit 601 may determine $GB_{n,1l}=g(BW_{n,1}, BW_{n,2})$ as a function decreasing with decreases of $BW_{n,1}$ and $BW_{n,2}$, but it is not limited thereto.

An adjustment solution in more details may refer to but not limited to descriptions in the first and second embodiments.

The network interface 602 is connected to the bandwidth adjustment unit 601, and external network systems to be adjusted. The network interface 602 is configured to communicate with external network systems to be adjusted, based on the control of the bandwidth adjustment unit 601 in a case that bandwidth of the channel of the network system is adjusted.

Therefore, in the embodiment, when the channels of the multiple network systems sharing the same frequency band are adjusted by the bandwidth adjustment unit 601 of the controller, a guard bandwidth between any two adjusted network systems is changed dynamically as a change in the bandwidth of the channel of the currently adjusted network systems, thereby reducing communication interference between the network systems sharing the same frequency band resource and ensuring the communication quality.

Fourth Embodiment

Figure 8:
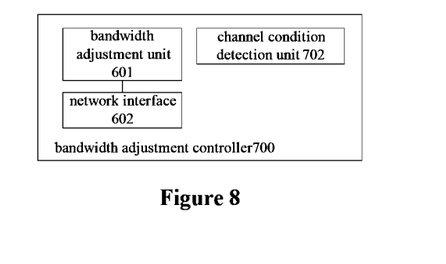
FIG. 8 is a schematic structural diagram of a bandwidth adjustment controller according to a fourth embodiment of the present application.

As shown in FIG. 8, a bandwidth adjustment controller 700 is provided according to an embodiment, which differs from the third embodiment mainly in that:

The controller may further include but not limited to a channel condition detection unit 702.

The channel condition detection unit 702 is configured to detect the channel of the first network system and/or the channel of the second network system to determine a busy degree of the channel of the first network system and/or a busy degree of the channel of the second network system.

Accordingly, the bandwidth adjustment unit 601 is configured to: adjust the bandwidth of the channel of the first network system and the bandwidth of the channel of the second network system adjacent to the guard bandwidth, based on the busy degree of the channel of the first network system and/or the busy degree of the channel of the second network system; and determine a bandwidth update value of the channel of the first network system, a bandwidth update value of the channel of the second network system and a bandwidth update value of the guard bandwidth. A specific adjustment solution refers to schemes described in the first to third embodiments.

Therefore, in addition to the advantages of the third embodiment, the embodiment further has the following advantages: the controller initiatively detects channel condition of the network system controlled by the controller, adjust the bandwidth of the channel of the network system based on the busy degree of the channel, thereby further improving the initiative of the channel bandwidth adjustment.

Fifth Embodiment

Figure 9:
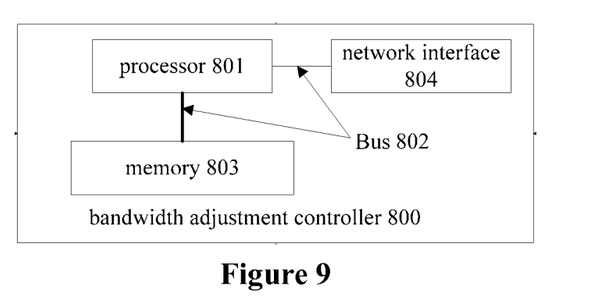
FIG. 9 is a schematic structural diagram of a bandwidth adjustment controller according to a fifth embodiment of the present application.

As shown in FIG. 9, a bandwidth adjustment controller 800 is provided according to an embodiment, which mainly includes a processor 801, a bus 802, a memory 803 and a network interface 804. The processor 801 is connected to the memory 803 through the bus 802, and the network interface 804 is connected to the processor 801 and an external network system.

The processor 801 is configured to execute a program stored in the memory 803, the program includes:

adjusting a bandwidth of a channel of a first network system and a bandwidth of a channel of a second network system adjacent to a guard bandwidth based on a user request or a channel condition; and determining a bandwidth update value of the channel of the first network system, a bandwidth update value of the channel of the second network system and a bandwidth update value of the guard bandwidth, such that the updated bandwidth of the channel of the first network system and the updated bandwidth of the channel of the second network system meet the user request or a requirement of the channel condition, and the bandwidth update value of the guard bandwidth meets a relation: $GB_{n,1l} = g(BW_{n,1}, BW_{n,2})$, where $GB_{n,1l}$ is the bandwidth update value of the guard bandwidth, $BW_{n,1}$ is the bandwidth update value of the channel of the first network system, $BW_{n,2}$ is the bandwidth update value of the channel of the second network system, and $GB_{n,1l} = g(BW_1, BW_{n,2})$ is a function increasing with an increase of any one of $BW_{n,1}$ and $BW_{n,2}$; and transmitting the bandwidth update value of the channel of the first network system to the first network system through the network interface 804; transmitting the bandwidth update value of the channel of the second network system to the second network system through the network interface 804, where the first network system adjusts the bandwidth of the channel of the first network system based on the bandwidth update value of the channel of the first network system, and the second network system adjusts the bandwidth of the channel of the second network system based on the bandwidth update value of the channel of the second network system.

In the embodiment according to the present application, optionally, the processor 801 executes instructions to:

in the step of adjusting a bandwidth of a channel of a first network system and a bandwidth of a channel of a second network system adjacent to a guard bandwidth based on a user request or a channel condition, and determining a bandwidth update value of the channel of the first network system, a bandwidth update value of the channel of the second network system and a bandwidth update value of the guard bandwidth, the bandwidth update value of the channel of the first network system and the bandwidth update value of the channel of the second network system meet the following condition:

$BW_{n,1} = n*BW_{e,1} = n'*BW_{e,1} + BW_{new,1l} + BW_{new,1r}$, and $BW_{n,2} = k*BW_{e,2} = k'*BW_{e,2} + (k-k')*BW_{e,2}$ where $BW_{e,1}$ is a basic bandwidth unit of the channel of the first network system, $n'*BW_{e,1}$ is an initial bandwidth of the channel of the first network system, n and n' each are natural numbers, $BW_{new,1l}$ is a bandwidth adjustment sub-amount for a first side of the channel of the first network system, where the first side is a side of the first network system close to the second network, $BW_{new,1r}$ is a bandwidth adjustment sub-amount for a second side of the channel of the first network system, where the second side is a side of the first network system opposite to the first side, $BW_{e,2}$ is a basic bandwidth unit of the channel of the second network system, $k'*BW_{e,2}$ is an initial bandwidth of the channel of the second network system, k and k' each are natural numbers, and $(k-k')*BW_{e,2}$ is a bandwidth adjustment amount for the channel of the second network system.

In the embodiment according to the present application, optionally, the processor 801 executes instructions to set $BW_{new,1r}$ to be zero.

In the embodiment according to the present application, optionally, the processor 801 executes instructions to determine $GB_{n,1l} = g(BW_{n,1}, BW_{n,2})$ to be a function decreasing with decreases of $BW_{n,1}$ and $BW_{n,2}$.

In the embodiment according to the present application, optionally, the processor 801 executes instructions to:

in the step of adjusting the bandwidth of the channel of the first network system and the bandwidth of the channel of the second network system adjacent to the guard bandwidth based on the user request or the channel condition, and determining the bandwidth update value of the channel of the first network system, the bandwidth update value of the channel of the second network system and the bandwidth update value of the guard bandwidth, adjust the bandwidth of the channel of the first network system and the bandwidth of the channel of the second network system adjacent to the guard bandwidth, based on a user bandwidth change request of the first network system and/or a user bandwidth change request of the second network system, and/or based on a busy degree of the channel of the first network system and/or a busy degree of the channel of the second network system; and determine the bandwidth update value of the channel of the first network system, the bandwidth update value of the channel of the second network system and the bandwidth update value of the guard bandwidth.

In the embodiment according to the present application, optionally, the processor 801 executes instructions to:

detect and report by a user of the first network system and/or the second network system or detect by a controller, the busy degree of the channel of the first network system and/or the busy degree of the channel of the second network system, where the controller is configured to control bandwidth adjustment of the first network system and bandwidth adjustment of the second network system.

In the embodiment according to the present application, optionally, the processor 801 executes instructions to:

in a case that the busy degree of the channel of the first network system is equal to or greater than a predetermined busy upper limit, the step of adjusting the bandwidth of the channel of the first network system and the bandwidth of the channel of the second network system adjacent to the guard bandwidth based on the user request or the channel condition, and determining the bandwidth update value of the first network system, the bandwidth update value of the second network system and the bandwidth update value of the guard bandwidth specifically includes:

setting an idle frequency band in a common frequency range as a channel of the first network system to replace the channel of the first network system to be adjusted;

setting n'*$BW_{e,1}$ to be zero;

adjusting the bandwidth of the channel of the first network system and the bandwidth of the channel of the second network system adjacent to the guard bandwidth based on the user request or the channel condition; and determining the bandwidth update value of the first network system, the bandwidth update value of the second network system and the bandwidth update value of the guard bandwidth.

In the embodiment according to the present application, optionally, the processor 801 executes instructions to:

after adjusting the bandwidth of the channel of the first network system and the bandwidth of the channel of the second network system adjacent to the guard bandwidth based on the user request or the channel condition and determining a bandwidth update value of the channel of the first network system, a bandwidth update value of the channel of the second network system and a bandwidth update value of the guard bandwidth, determine an interference source of the channel of the first network system to be adjusted; and set the channel of the first network system to be adjusted as a channel of the second network system in a case that the interference source comes from the second network system; else set the channel of the first network system to be adjusted as the guard bandwidth.

It can be understood clearly by those skilled in the art from the above descriptions of embodiments that, the embodiments may be implemented with software and necessary common hardware platform, or with hardware. Based on this understanding, the essences of the above technical schemes or parts of the above technical schemes which contribute to the conventional technology may be embodied with a software product. The software product may be stored in a computer readable storage medium such as an ROM/RAM, a diskette and an optical disk. And the software product includes several instructions enabling a computer device (may be a personal computer, a server or a network device) to perform the methods according to the embodiments or according to certain parts of the embodiments.

What is claimed is:

1. A bandwidth adjustment method, comprising:

determining a bandwidth update value of a channel of a first network system and a bandwidth update value of a channel of a second network system based on a user request or a channel condition; and transmitting the bandwidth update value of the channel of the first network system to the first network system and transmitting the bandwidth update value of the channel of the second network system to the second network system;

wherein the bandwidth update value $BW_{n,1}$ of the channel of the first network system and the bandwidth update value $BW_{n,2}$ of the channel of the second network system meet the following:

$BW_{n,1} = n*BW_{e,1} = n'*BW_{e,1} + BW_{new,1l} + BW_{new,1r}$, and $BW_{n,2} = k*BW_{e,2} = k'*BW_{e,2} + (k-k')*BW_{e,2}$;

$BW_{e,1}$ is a basic bandwidth unit of the channel of the first network system;

n'*$BW_{e,1}$ is an initial bandwidth of the channel of the first network system;

n and n' each are natural numbers;

$BW_{new,1l}$ is a bandwidth adjustment sub-amount for a first side of the channel of the first network system, wherein the first side is a side of the first network system close to the second network;

$BW_{new,1r}$ is a bandwidth adjustment sub-amount for a second side of the channel of the first network system, wherein the second side is a side of the first network system opposite to the first side;

$BW_{e,2}$ is a basic bandwidth unit of the channel of the second network system;

k'*$BW_{e,2}$ is an initial bandwidth of the channel of the second network system;

k and k' each are natural numbers; and $(k-k')*BW_{e,2}$ is a bandwidth adjustment amount for the channel of the second network system.

2. The bandwidth adjustment method according to claim 1, further comprising:

determining a bandwidth update value of a guard bandwidth;

wherein:

the bandwidth update value of the guard bandwidth further meets the following relation:

$GB_{n,1l} = g(BW_{n,1}, BW_{n,2})$; and $GB_{n,1l}$ is the bandwidth update value of the guard bandwidth, and $GB_{n,1l} = g(BW_{n,1}, BW_{n,2})$ is a function increasing with an increase of any one of $BW_{n,1}$ and $BW_{n,2}$.

3. The bandwidth adjustment method according to claim 1, wherein $BW_{new,1r}$ is set to be zero.

4. The bandwidth adjustment method according to claim 2, wherein $GB_{n,1l} = g(BW_{n,1}, BW_{n,2})$ is further a function decreasing with decreases of $BW_{n,1}$ and $BW_{n,2}$.

5. The bandwidth adjustment method according to claim 2, wherein the adjusting the bandwidth of the channel of the first network system and the bandwidth of the channel of the second network system adjacent to the guard bandwidth based on the user request or the channel condition comprises one of the following:

adjusting the bandwidth of the channel of the first network system and the bandwidth of the channel of the second network system adjacent to the guard bandwidth, based on a user bandwidth change request of the first network system and/or a user bandwidth change request of the second network system;

adjusting the bandwidth of the channel of the first network system and the bandwidth of the channel of the second network system adjacent to the guard bandwidth, based on a busy degree of the channel of the first network system and/or a busy degree of the channel of the second network system; and adjusting the bandwidth of the channel of the first network system and the bandwidth of the channel of the second network system adjacent to the guard bandwidth based on the following:

a user bandwidth change request of the first network system and/or a user bandwidth change request of the second network system, and a busy degree of the channel of the first network system and/or a busy degree of the channel of the second network system.

6. The bandwidth adjustment method according to claim 5, wherein:

the busy degree of the channel of the first network system and/or the busy degree of the channel of the second network system are detected and reported by a user of the first network system and/or a user of the second network system, or detected by a controller; and the controller is configured to control bandwidth adjustment of the first network system and bandwidth adjustment of the second network system.

7. The bandwidth adjustment method according to claim 5, wherein when the busy degree of the channel of the first network system is equal to or greater than a predetermined busy upper limit, the adjusting the bandwidth of the channel of the first network system and the bandwidth of the channel of the second network system adjacent to the guard bandwidth based on the user request or the channel condition comprises:

setting an idle frequency band in a common frequency range as a channel of the first network system to replace the channel of the first network system to be adjusted;

setting $n'*BW_{e,1}$ to be zero; and adjusting the bandwidth of the channel of the first network system and the bandwidth of the channel of the second network system adjacent to the guard bandwidth based on the user request or the channel condition.

8. The bandwidth adjustment method according to claim 7, further comprising:

determining an interference source of the channel of the first network system to be adjusted; and setting the channel of the first network system to be adjusted as one of the following:

a channel of the second network system when the interference source comes from the second network system; and the guard bandwidth when the interference source does not come from the second network system.

9. The bandwidth adjustment method according to claim 2, wherein the channel of the first network system is one of the following:

a continuous extending channel; and a plurality of channel frequency ranges with a guard interval between any two adjacent channel frequency ranges.

10. The bandwidth adjustment method according to claim 2, wherein the channel of the second network system is one of the following:

a continuous extending channel; and a plurality of channel frequency ranges with a guard interval between any two adjacent channel frequency ranges.

11. A bandwidth adjustment controller, comprising a processor and a transmitter, wherein the processor is configured to:

determine a bandwidth update value of a channel of a first network system and a bandwidth update value of a channel of a second network system based on a user request or a channel condition;

wherein the transmitter is configured to:

transmit the bandwidth update value of the channel of the first network system to the first network system and transmit the bandwidth update value of the channel of the second network system to the second network system;

wherein the transmitter is connected to the processor; and wherein the bandwidth update value $BW_{n,1}$ of the channel of the first network system and the bandwidth update value $BW_{n,2}$ of the channel of the second network system meet the following:

$$BW_{n,1}=n*BW_{e,1}=n'*BW_{e,1}+BW_{new,1l}+BW_{new,1r}, \text{ and}$$

$$BW_{n,2}=k*BW_{e,2}=k'*BW_{e,2}+(k-k')*BW_{e,2};$$

$BW_{e,1}$ is a basic bandwidth unit of the channel of the first network system;

$n'*BW_{e,1}$ is an initial bandwidth of the channel of the first network system;

n and n' each are natural numbers;

$BW_{new,1l}$ is a bandwidth adjustment sub-amount for a first side of the channel of the first network system, wherein the first side is a side of the first network system close to the second network;

$BW_{new,1r}$ is a bandwidth adjustment sub-amount for a second side of the channel of the first network system, wherein the second side is a side of the first network system opposite to the first side;

$BW_{e,2}$ is a basic bandwidth unit of the channel of the second network system;

$k'*BW_{e,2}$ is an initial bandwidth of the channel of the second network system;

k and k' each are natural numbers; and $(k-k')*BW_{e,2}$ is a bandwidth adjustment amount for the channel of the second network system.

12. The bandwidth adjustment controller according to claim 11, wherein:

the processor is further configured to determine a bandwidth update value of a guard bandwidth to meet the following relation:

$$GB_{n,1l}=g(BW_{n,1}, BW_{n,2}); \text{ and}$$

$GB_{n,1l}$ is the bandwidth update value of the guard bandwidth, and $GB_{n,1l}=g(BW_{n,1}, BW_{n,2})$ is a function increasing with an increase of any one of $BW_{n,1}$ and $BW_{n,2}$.

13. The bandwidth adjustment controller according to claim 12, wherein the processor is further configured to:

detect the channel of the first network system and/or the channel of the second network system, and to determine a busy degree of the channel of the first network system and/or a busy degree of the channel of the second network system;

adjust the bandwidth of the channel of the first network system and the bandwidth of the channel of the second network system adjacent to the guard bandwidth, based on a user bandwidth change request of the first network system and/or a user bandwidth change request of the second network system;

adjust the bandwidth of the channel of the first network system and the bandwidth of the channel of the second network system adjacent to the guard bandwidth, based on the busy degree of the channel of the first network system and/or the busy degree of the channel of the second network system; and adjust the bandwidth of the channel of the first network system and the bandwidth of the channel of the second network system adjacent to the guard bandwidth based on the following:

the user bandwidth change request of the first network system and/or the user bandwidth change request of the second network system, and the busy degree of the channel of the first network system and/or the busy degree of the channel of the second network system.

* * * * *